June 11, 1957
S. A. HOSHOWSKY
2,795,514
METHOD FOR IMPROVING THE DRY ADHESION
OF A PHOSPHOR SCREEN
Filed Aug. 5, 1954
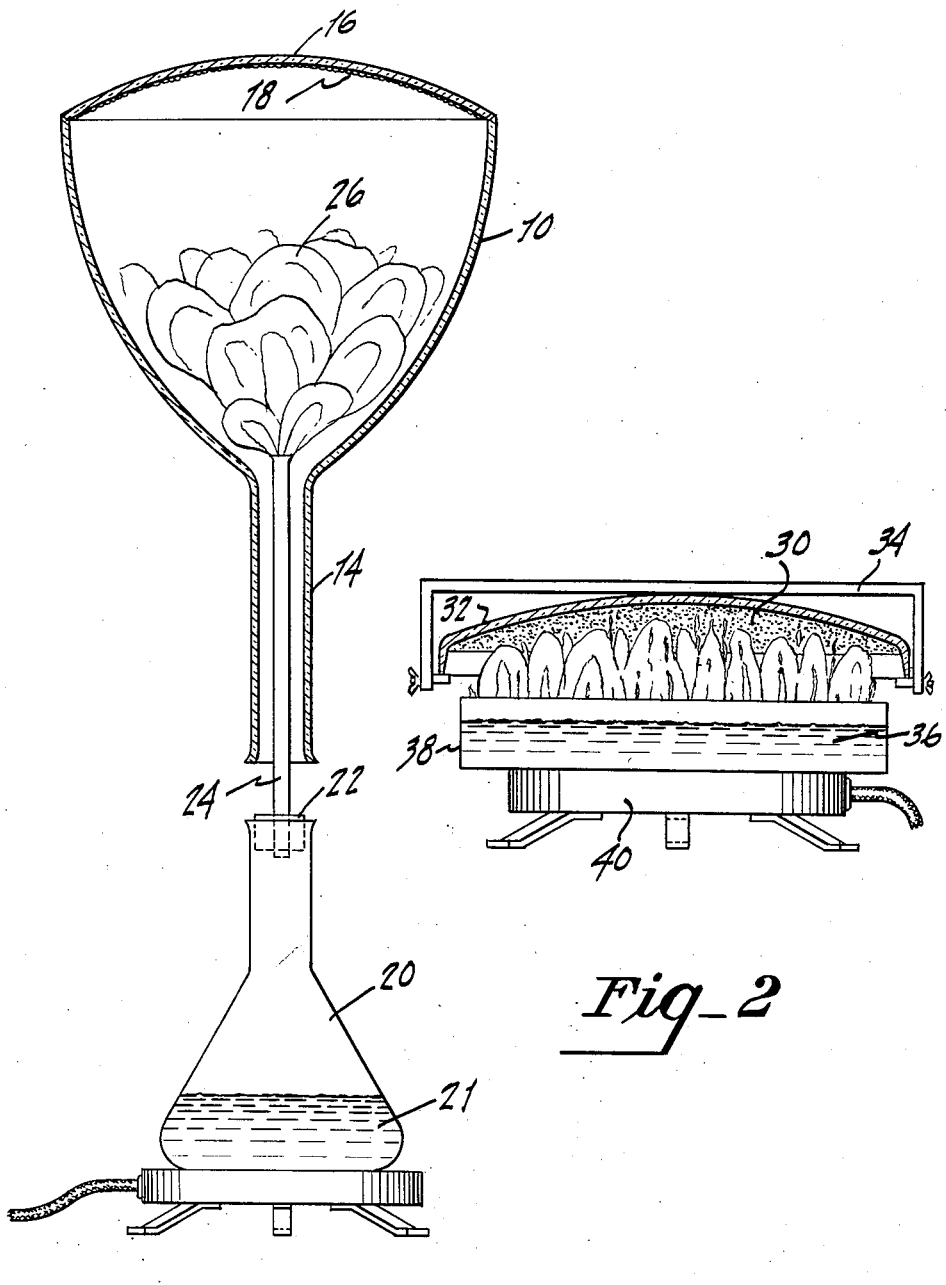
Fig_1
Fig_2
INVENTOR.
STANLEY A. HOSHOWSKY
BY
William A. Zalesak
ATTORNEY

United States Patent Office 2,795,514
Patented June 11, 1957

2,795,514

METHOD FOR IMPROVING THE DRY ADHESION OF A PHOSPHOR SCREEN

Stanley A. Hoshowsky, East Petersburg, Pa., assignor to Radio Corporation of America, a corporation of Delaware Application August 5, 1954, Serial No. 448,059

8 Claims. (Cl. 117—33.5)

The invention is directed to a cathode ray tube and, particularly, to the formation of the phosphor screen of television picture tubes.

Normally, cathode ray tube screens are formed by settling a layer of phosphor particles on the inner surface of the face plate of the tube envelope. The phosphor suspension from which the screen is settled contains a soluble silicate or other material, a portion of which is precipitated out with the settled phosphor. This material acts as a binding agent to prevent slippage of the phosphor coating on the glass surface of the face plate when the bulb is tilted to pour the liquid of suspension out of the bulb. This adhesion of the pohsphor coating to the face plate surface is known as wet adherence and is necessary for the successful screening of the phosphor coating.

Upon drying the wet screen, the binding material causes a further adherence of the phosphor to the glass face plate surface and this adherence is known as dry adherence of the phosphor screen. Other methods of screening the face plate of a cathode ray tube to form a phosphor coating include dusting the phosphor onto the face plate surface; silk screening phosphor through a stencil; flowing a heavy phosphor suspension over the face plate surface, as well as electro-optical means in which the phosphor material is deposited together with a photosensitive material or photoresist which, upon exposure to light, provides an insoluble phosphor coating. In whatever method of phosphor screening used to provide the phosphor coating on the face plate of a tube, it is desriable that the dry adherence of the phosphor coating be sufficiently great to withstand removal of the phosphor by any subsequent tube processing or to withstand normal tube operation.

In large cathode ray tubes used for television picture viewing, the phosphor screen is further processed to provide a reflective aluminum film over the phosphor surface for intensifying the light output from the screen during tube operation. This aluminizing process may include pouring or spraying water onto the dried phosphor screen followed by a spraying of a lacquer material to provide a hard, flat surface upon which the aluminum film may be deposited. In some types of television tubes used for color, it is necessary to form in sequence a plurality of phosphor coatings on the face plate of the tube which, together with the aluminizing procedure, includes considerable exposure of the phosphor films to activities which tend to destroy or remove the phosphor from the face plate. Thus, in screening processes of the types outlined, it is necessary that the phosphor material have great dry adherence to the face plate so that the phosphor will not be disturbed by subsequent handling.

It is, therefore, an object of this invention to provide a novel method of forming a phosphor screen on the inner surface of the face plate of a tube.

It is an additional object of this invention to provide a phosphor screen having an increased dry adhesion to the face plate of the tube.

It is another object of this invention to provide a method of increasing the dry adherence of a phosphor coating on the face plate of a television picture tube.

The invention is in the condensation of boric acid from a vapor state onto the phosphor particles of a phosphor screen. Upon drying, the dry adherence of the screen is greatly increased.

Figure 1 is a schematic showing of a method of applying boric acid to the phosphor screen within a cathode ray tube bulb in accordance with the invention;

Figure 2 shows the application of the invention to a pre-screened face plate for a cathode ray tube.

Phosphor screens applied to the face plates of cathode ray tubes require considerable adherence of the phosphor material in its dry state to the glass surface of the face plate. This is necessary so that the phosphor screen is not disturbed by subsequent handling and tube processing. Phosphor screens may be formed by settling from phosphor suspensions, by dusting, printing, by electrostatic deposition of dry phosphor and by photoelectric processes. In many of the above phosphor screens, in particular, where the phosphor is deposited as a dry powder or where the organic binder material has been baked out, it is difficult to pour liquids containing inorganic binders on the deposited phosphor film to increase the dry strength since the phosphor screen is easily damaged by the poured liquid.

In accordance with the invention, the dry strength of a phosphor film or screen is increased by the vaporization and condensation of a material onto the phophor particles and glass substrate comprising the luminescent screen. Figure 1 schematically shows means for condensing boric acid material from a vapor state onto a phosphor screen. Figure 1 discloses a cathode ray tube envelope 10 of the type used for television picture tubes, for example. Envelope 10 can be made from metal and glass portions but, as shown in Figure 1, consists of a glass bulb portion having a tubular neck 14. The opposite wall of envelope 10 consists of a glass face plate 16 which may be either a round or a rectangular configuration depending upon the type of television tube. The inner surface of face plate 16 is coated with a thin film or coating 18 of phosphor material which luminesce with visible light under electron bombardment.

Phosphor film 18 may be formed by settling finely divided phosphor particles from a liquid suspension of the particles formed as a liquid pool in the bottom of bulb 10. The phosphor suspension normally includes a soluble silicate or other material which aids to bind the phosphor particles onto the surface of face plate 16. Thus, when the supernatant liquid of the phosphor suspension is poured out of the tube, there is sufficient adherence of the wet phosphor particles to the face plate 16 to prevent sliding or displacement of the coating 18. Upon drying, the binding material in solution aids to cement the phosphor particles to the surface of face plate 16.

Phosphor screen 18 may also be formed by dusting onto the surface of face plate 16 phosphor material which is introduced into the bulb 10 as finely divided particles which settle through the air of the tube onto the face plate 16. Screen 18 may also be deposited by forming an electrostatic charge on the inner surface of plate 18 and then introducing dry phosphor dust into the bulb 10. The phosphor particles are then attracted onto the surface of plate 16 to form a film of phosphor material.

In some applications of color television tubes, the phosphor coating 18 is formed of groups of phosphor dots in which the dots of each group are formed of different phosphor material which, respectively, luminesce under electron bombardment with different colored light such as red, blue and green. It has been found necessary in color tubes of this type to put down all the dots of a single phosphor simultaneously at a different time than of the formation of the dots of another phosphor material. The phosphor dots can be put down by printing, silk screening or any other known means. Since, however, each phosphor is put down at a different time, the first coating of phosphor dots in the color tube is exposed to subsequent screening processes in which the other layers of phosphor are also deposited upon the face plate 16.

Whatever the method used for the screening of the phosphor film 18 or whatever the configuration of the final phosphor screen, it has been found advantageous for large television picture tubes to also apply a reflective metal coating over the exposed surface of phosphor 18. Normally, the metal film is aluminum and it provides a reflective metallic surface for intensifying the light output from the phosphor screen portions struck by beam electrons during tube operation. This metal filming process involves pouring water or some other liquid into the bulb 10 in order to wet the screen 18. A lacquer film is sprayed on the wet screen which, upon drying, provides a hard, smooth surface over the phosphor screen 18 and upon which can be evaporated a thin film of metal to provide the reflective metal coating.

As pointed out above, a phosphor screen 18, formed on the face plate of a cathode ray tube, undergoes considerable exposure in subsequent tube processing so that it is necessary that the phosphor particles of screen 18 adhere strongly to the glass surface of plate 16 in order to resist removal of the screen. In accordance with the invention, it has been found that if boric acid is condensed from a vapor form of the material onto a dry phosphor screen 18, the adherence of the phosphor to the face plate surface is greatly increased. A successful method of applying boric acid vapor to screen 18 is that in which a solution of boric acid 21 is formed by mixing between 25 and 35 grams of boric acid in 100 cc. water. This solution is placed in a container such as a flask 20, for example. Flask 20 is closed with a stopper 22 having a tube 24 therethrough and extending within the neck 14 of the tube envelope 10. The boric acid solution 21 in flask 20 is heated to boiling and until a mixture of steam and boric acid vapor 26 passes into envelope 10 through tube 24. Screen 18 is thoroughly wet with the vapor from the boiling aqueous solution of boric acid and then dried by air jet and baked at around 400° centigrade.

The amount of vapor condensed on screen 18 is not critical but it is desirable to saturate the screen with the condensed boric acid and water vapor to provide sufficient adhesion of the dry phosphor to plate 16. The steaming process may be repeated several times if it is found desirable to further increase the boric acid content in the screen to improve the dry adherence of the phosphor. By chemical tests, it was estimated that the amount of boric acid condensed in one steaming operation was in the order of a few milligrams per 1000 cm.$^2$ of screen area. This small amount, however, is sufficient to increase the dry adherence of screen 18. Because of this, the steaming operation may be repeated many times without becoming detrimental to the screen.

The amount of boric acid used in the water solution 21 also is not critical although around 30 grams of boric acid per 100 cc. water gives good results. The boric acid used is $H_3BO_3$ dry powder or may be $B_2O_3 \cdot 3H_2O$. The baking of the screen may be done as a separate step or may be done during the baking of the graphite coating normally painted on the inner surface of neck 14 and bulb 10. During baking, the boric acid loses its water to become boric oxide which, in the finished screen, greatly increases the adherence of the phosphor particles of screen 18 to the face plate 16. After baking, the screen 18, because of its greater dry adherence, is not disturbed by subsequent handling and tube processing.

Since boric acid is soluble in many organic alcohols as well as other organic solvents, this method of increasing the dry adherence of a phosphor screen can be used with many phosphor materials which are sensitive to water. Boric acid is soluble in methyl, ethyl, propyl, butyl, and amyl alcohols with the solubility decreasing as the molecular weight of the alcohol increases. In the lower boiling methyl or ethyl alcohol, boric acid vaporizes rapidly from the solutions. These alcohols are preferable to water as a solvent for increasing the dry adherence if rapid vaporization is desired. It is believed that a boric acid ester is formed with the alcohol accounting for the rapid vaporization. A solution of boric acid in iso-amyl alcohol vaporizes more slowly but provides a satisfactory vapor of alcohol and boric acid which can be condensed on the phosphor screen to provide greater adherence.

Other organic solvents, such as organic esters, in which boric acid is practically insoluble can be used to increase the dry adherence of phosphor screens in the manner described above. For example, ethyl or butyl acetate can be used although boric acid is very sparingly soluble in these solvents. A large excess of boric acid is placed in the organic ester solvent and boiled. The vapor that comes off is condensed on the luminescent screen which, after baking at around 400° C. is found to increase the adherence of the phosphor screen considerably. Boric acid vapor can also be applied from a solution of the material in a mixture of organic liquids or a mixture of water and organic liquids whether they are miscible or not.

As described above, the boric acid solution vapor is condensed in amounts to saturate the phosphor screen. However, the time of condensation will vary with the surface to be covered, with the concentration of boric acid in the liquid, with the volume of vapor being evolved from the system employed, as well as with the amount of ultimate dry adhesion desired. The time of condensation on a dusted luminescent screen in a 17-inch kinescope was in the order of one to three minutes.

The concentration of boric acid in the liquid used is not critical except that higher concentrations will result in more rapid vaporization. For example, the following concentrations have been used with satisfactory results:

| Wt. Boric Acid in Grams per 100 cc. Liquid | Liquid |
| --- | --- |
| 25-35 | Water. |
| 30-50 | Methyl Alcohol. |
| 20-30 | Iso-Amyl Alcohol. |
| 25 | Butyl Acetate. |
| 25 | Ethyl Acetate. |

It is not necessary to boil the liquid in order to condense boric acid onto a luminescent screen although boiling is a convenient way to obtain rapid vaporization. For example, a slow stream of air may be used to help transport the vapor from a hot but not boiling solution to the luminescent screen.

Since boric acid has a considerable vapor pressure when heated in the dry state, this property was utilized in condensing it on a luminescent screen. Dry boric acid powder can be heated to about 100° C. and the vapor allowed to condense on a luminescent screen at room temperature. This results in increased adhesion of the phosphor screen to the face plate. However, this method of vaporization of the acid is slow when compared to a boiling solution of an organic alcohol.

The boric oxide obtained when the boric acid is baked in a phosphor screen does not lower the luminescence efficiency of the phosphor under electron bombardment. For example, in a zinc sulfide-zinc cadmium sulfide phosphor screen in a television tube, up to 0.2 mg. per cm.$^2$ of boric acid has been baked in the screen at 400° C. without any charge in the luminescence efficiency. This quantity of boric acid is very much larger than required to give sufficient dry adhesion for normal processing of electron tubes containing luminescent screens.

It also appears that the type of phosphor material used is not critical. The invention can be practiced with conventional television phosphors consisting of mixtures of activated zinc sulfide and zinc cadmium sulfide. Also, the dry adherence of phosphor screens formed from calcium tungstate and calcium magnesium silicate is greatly increased by the novel application of boric acid.

Figure 2 shows an alternative method of applying the boric acid vapor onto a phosphor screen 30 formed on a cup-shaped face plate 32 which may be sealed into a cathode ray tube after screen formation. Because of the absence of a bulb portion, as shown in Figure 1, the face plate 32 is enclosed in a partially closed container 34 into which the boric acid vapor may be introduced from an open container 38 containing boiling boric acid solution 36. The solution may be heated by any form of heating means such as an electric plate 40.

I claim:

1. The method of forming a phosphor screen comprising the steps of, applying a phosphor coating to the surface of a supporting member, condensing boric acid from a vapor thereof onto the phosphor coating, drying said phosphor coating, and baking said screen to change said boric acid on said screen to boric oxide.

2. The method of forming a phosphor screen comprising the steps of, applying a phosphor coating to the surface of a supporting member, condensing a vapor containing boric acid on the particles of said phosphor coating, and baking said screen to change said boric acid on said screen to boric oxide.

3. The method of forming a phosphor screen comprising the steps of, applying a phosphor coating to the surface of a supporting member, condensing a vapor of boric acid solution onto said phosphor screen, and baking said screen to change said boric acid on said screen to boric oxide.

4. The method of forming a phosphor screen comprising the steps of, applying a phosphor coating to the surface of a supporting member, condensing the vapor of an aqueous solution of boric acid on the particles of said phosphor tube, and baking said screen to change said boric acid on said screen to boric oxide.

5. The method of forming a phosphor screen comprising the steps of, applying a phosphor coating to the surface of a supporting member, condensing the vapor of an organic solution of boric acid on the phosphor particles of said phosphor screen, and baking said screen to change said boric acid on said screen to boric oxide.

6. The method of forming a phosphor screen comprising the steps of, applying a phosphor coating to the surface of a supporting member, condensing a vapor of boric acid solution on said phosphor screen, baking said screen to change said boric acid to boric oxide.

7. The method of increasing the dry adherence of a phosphor screen formed on an inner surface of a cathode ray tube bulb; said method comprising the steps of, introducing into said bulb a vapor containing boric acid, condensing said vapor with said boric acid on said phosphor screen, drying said screen, and baking said bulb to change said boric acid on said screen to boric oxide.

8. The method of increasing the dry adherence of a phosphor screen formed on an inner surface of a cathode ray tube bulb; said method comprising the steps of, introducing into said bulb a vapor of a solution of boric acid, condensing said vapor containing boric acid on the particles of said screen, baking said bulb to change said boric acid on said screen to boric oxide.

References Cited in the file of this patent
UNITED STATES PATENTS

| | | |
|---|---|---|
| 2,233,786 | Law | Mar. 4, 1941 |
| 2,298,968 | Roberts | Oct. 13, 1942 |
| 2,660,539 | Putnam | Nov. 24, 1953 |